United States Patent
Fetterman, Jr.

(10) Patent No.: US 6,543,474 B2
(45) Date of Patent: Apr. 8, 2003

(54) PRESSURE EQUALIZING CHECK VALVE

(76) Inventor: Roy A. Fetterman, Jr., 302 Whitemarsh Valley Rd., Fort Washington, PA (US) 19034-2013

( * ) Notice: Subject to any disclaimer, the term of this patent is extended or adjusted under 35 U.S.C. 154(b) by 101 days.

(21) Appl. No.: 09/846,046

(22) Filed: May 1, 2001

(65) Prior Publication Data

US 2002/0170602 A1 Nov. 21, 2002

(51) Int. Cl.$^7$ .......................... F16K 15/03; F16K 17/26
(52) U.S. Cl. .................. 137/493.1; 137/519.5; 137/460; 137/527.8; 122/14.31
(58) Field of Search .................. 122/14.31; 137/512, 137/512.1, 512.2, 512.3, 513.3, 513.5, 527, 493, 493.1, 517, 521, 527.8, 519.5, 460, 493.7; 251/118

(56) References Cited

U.S. PATENT DOCUMENTS

| | | | | |
|---|---|---|---|---|
| 880,088 A | * | 2/1908 | Miller | 137/493.1 |
| 1,661,442 A | * | 3/1928 | Nacey | 137/512.2 |
| 1,913,027 A | * | 6/1933 | Griffith | 137/493.1 |
| 2,578,590 A | | 12/1951 | Perrault | |
| 3,212,520 A | * | 10/1965 | Carlton | 137/493.1 |
| 4,537,213 A | | 8/1985 | Molina | |
| 4,596,263 A | | 6/1986 | Snider | |
| 4,617,959 A | * | 10/1986 | Yamada | 137/512.2 |
| 4,693,269 A | | 9/1987 | Yamada | |
| 4,964,422 A | | 10/1990 | Ball et al. | |
| 6,196,162 B1 | * | 3/2001 | Sparrowhawk | 122/14.31 |

* cited by examiner

Primary Examiner—Michael Powell Buiz
Assistant Examiner—Ramesh Krishnamurthy
(74) Attorney, Agent, or Firm—Howson & Howson

(57) ABSTRACT

A flapper-type anti-siphoning check valve for a domestic water system has an auxiliary valve built into the flapper. The auxiliary valve permits slow reverse flow of water through the check valve when the flapper is closed to prevent build-up of pressure in the user's water system, but closes as a result of more rapid reverse flow of water in the event of a sudden drop in supply pressure.

22 Claims, 2 Drawing Sheets

PRESSURE EQUALIZING CHECK VALVE

FIELD OF THE INVENTION

This invention relates to liquid check valves and more particularly to an improved check valve for permitting flow of liquid in a first direction and preventing substantial flow in the opposite direction, while also preventing pressure build-up in the liquid on the downstream side of the valve.

BACKGROUND OF THE INVENTION

In a municipal water supply system, in the event of a failure in the water supply, due for example to a water main break, a siphoning effect may cause water to flow back into the main conduit. Ordinarily, this is not a serious problem. However, if a particular water customer happens to be filling a vessel with water through a hose at the time the break occurs, and the hose is immersed in the liquid in the vessel, the liquid will be drawn through the hose and ultimately into the main conduit. When the break is repaired, the liquid will be present as a contaminant in the water delivered not only to the particular customer, but also to the customer's neighbors. For example, swimming pool water can be drawn into the main conduit. Worse yet, fertilizers, herbicides pesticides, and other noxious materials can appear as contaminants in a common water supply as a result of siphoning.

To guard against such contamination of the water supply, a check valve is frequently installed in homes and other buildings, usually in the main water line near the water meter, to prevent siphoning of water back into the common supply conduit in the event of a water supply failure. The check valve is typically in the form of a flapper valve built into a brass fitting which is installed in the user's main water line.

In a municipal water supply system, the pressure of the water delivered to the utility's customers ordinarily corresponds to the regulator setting at the utility's pumping facility, or to the height of the water in a tower or standpipe used as a local reservoir. Thus, in the absence of a check valve, the water pressure in a customer's water lines will not ordinarily exceed the supply pressure. However, when a check valve is installed in the water supply line to a house, for example, the pressure in the water lines throughout the house is no longer necessarily regulated by the supply pressure. Thus, the water heater may cause the pressure to rise excessively, to be relieved only when someone opens a faucet.

Repeated application of excessive pressure to the interior of a water heater is known to accelerate heater failure. Moreover, if the safety relief valve, which is required on all water heaters, fails to release water during an overpressure condition, breakage of the water heater or of a pipe or fitting can occur.

SUMMARY OF THE INVENTION

The principal object of this invention is to provide a liquid check valve which not only avoids the undesirable effects of reverse flow when the pressure on the upstream side of the check valve falls rapidly, but which also prevents gradual build-up of pressure on the downstream side of the check valve by allowing for pressure equalization.

In general, a pressure equalizing check valve in accordance with the invention comprises a liquid conduit having an inlet port and an outlet port, the liquid conduit being closed except for the inlet and outlet ports. A valve seat and cooperating main valve closure element are provided within the liquid conduit. The main valve closure element is movable, in response to flow of liquid in a first direction through the conduit from the inlet port toward the outlet port, to an open position in which it is out of contact with the seat and permits free flow of liquid through the conduit, and in response to flow of liquid in a second direction opposite to the first direction through the conduit from the outlet port toward the inlet port, to a closed position in which it is in contact with the seat, and at least substantially retards flow through the conduit in the second direction. A restricted passage connects the inlet port to the outlet port at least when the main valve closure element is in its closed position. An auxiliary valve controls flow through the restricted passage when the main valve closure element is in its closed position. The auxiliary valve comprises an auxiliary valve closure element and an auxiliary seat. The auxiliary valve closure element is normally held away from the auxiliary seat and engageable with the auxiliary seat in response to flow of liquid through the restricted passage, from the outlet port toward the inlet port, at a rate in excess of a predetermined rate, to shut off flow of liquid through the auxiliary passage substantially completely. Thus, when the main valve closure element is in its closed position, the auxiliary valve permits slow flow of liquid through the restricted passage in the main valve closure element so that the liquid pressure at the outlet port is held at a level substantially equal to the liquid pressure at the inlet port. However, when the liquid pressure at the inlet port drops substantially below the liquid pressure at the outlet port, the auxiliary valve closes, thereby substantially completely shutting off flow through the conduit in the second direction.

A pressure equalizing check valve in accordance with a preferred embodiment of the invention utilizes a pivoted flapper as the main valve closure element, as in a conventional check valve. However, the check valve includes an auxiliary valve incorporating a moving ball. The auxiliary valve is normally open, preventing the pressure on the downstream side of the check valve from significantly exceeding the pressure on the upstream side. Thus, even when the check valve is closed, as a result of absence of demand, the pressure on the downstream side will follow variations in upstream pressure and will correspond closely to the pressure on the upstream side. However, when a relatively sudden decrease in upstream pressure is experienced, the auxiliary valve will close, preventing siphoning of liquid from the downstream side to the upstream side.

The auxiliary valve is preferably built into, and carried by the flapper, keeping the device structurally simple and compact, and also making it possible, in some embodiments, to remove the auxiliary valve assembly for repair or replacement by simply removing the flapper and auxiliary valve assembly as a unit, leaving the check valve body in place on the line in which it was installed.

The ball can be heavier than water, in which case, the seat engaged by the ball should face downward when the flap is closed. Alternatively, the ball can be lighter than water, in which case the seat should face upward when the flap is closed.

DETAILED DESCRIPTION OF THE PREFERRED EMBODIMENTS

Figure 1:
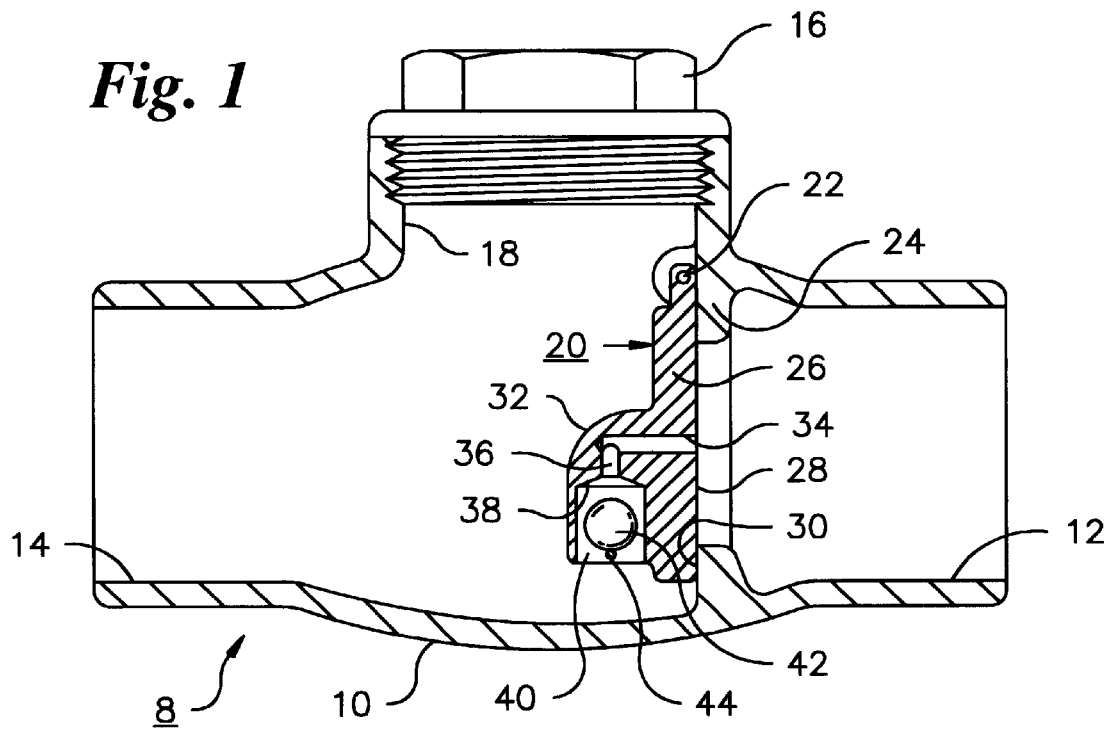
FIG. 1 is an axial section showing a pressure equalizing check valve in accordance with the invention in the condition in which no forward flow is taking place and the pressures at the inlet and outlet are the same.
Figure 2:
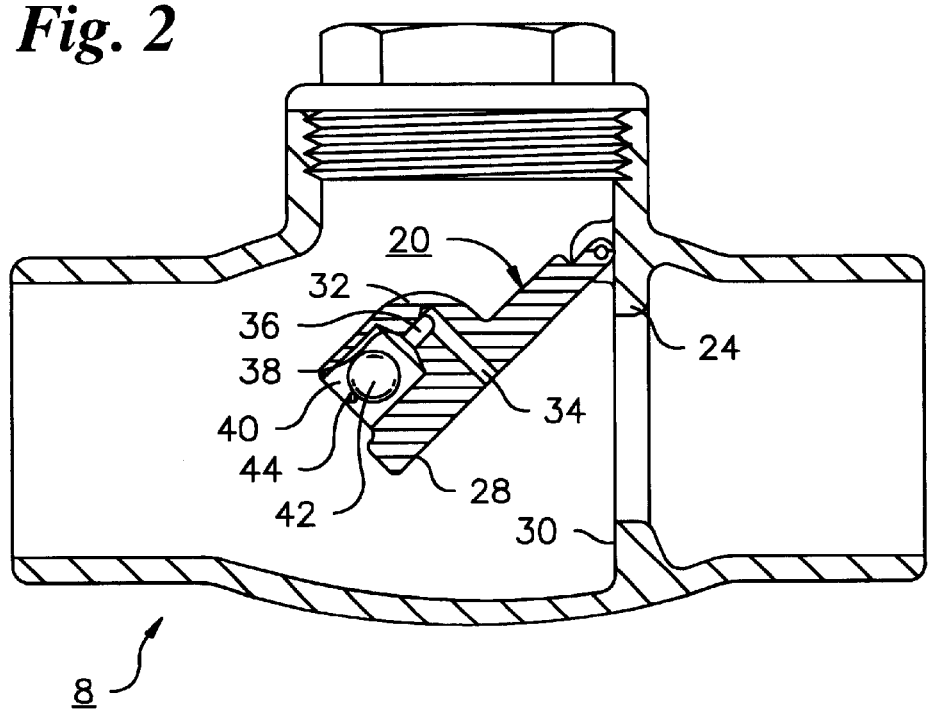
FIG. 2 is an axial section showing the same valve in the condition in which forward flow is taking place.
Figure 3:
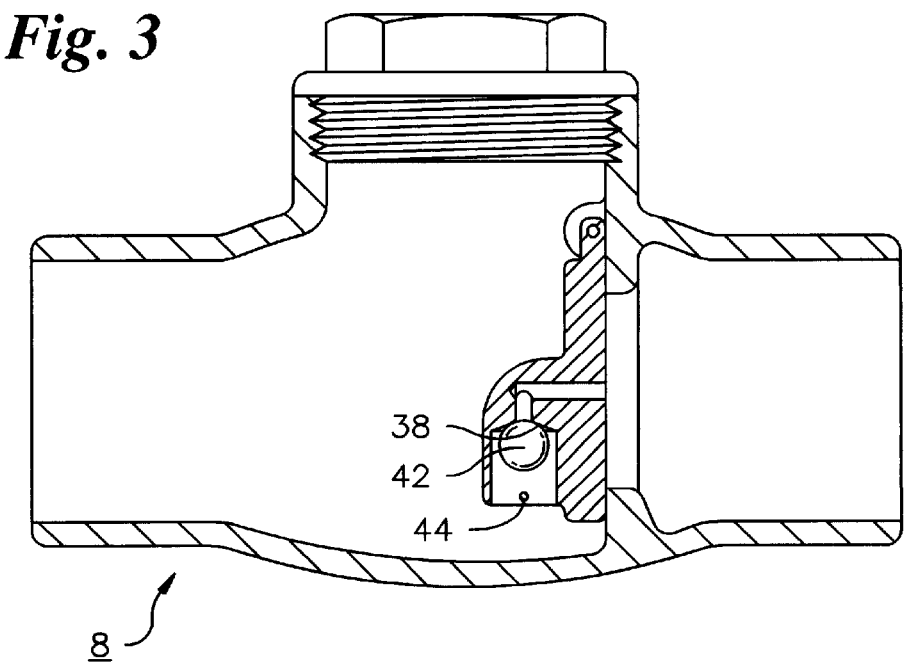
FIG. 3 is an axial section showing the same valve in the condition in which the pressure at the inlet of the valve has dropped suddenly.

A preferred pressure equalizing check valve 8, as shown in FIGS. 1, 2 and 3, comprises a cast valve body 10 having an inlet port 12, an outlet port 14, and an access plug 16 threaded into an access port 18, which is provided to permit assembly of the valve by insertion of a flapper 20.

The flapper 20, which constitutes the main valve closure element of the check valve, is pivoted on a pin 22 for swinging movement from a closed condition as depicted in FIG. 1, to an open condition as depicted in FIG. 2. In the closed condition, the flapper is in engagement with an annular seat 24 formed in the valve body. In the open condition, the flapper permits free flow of liquid from the inlet port 12 to the outlet port, but when it is closed, the flapper substantially restricts flow in the opposite direction, that is from the outlet port toward the inlet port. The valve, as described thus far, is essentially a one-way check valve, permitting liquid flow in one direction, but substantially restricting liquid flow in the opposite direction. Except for the particular details of the flapper, the valve can be identical to a conventional flapper-type check valve of the kind used in domestic water systems.

The flapper comprises a casting 26 having a face 28 engageable with a face 30 of the annular seat when the flapper is in its closed condition. An auxiliary valve housing 32 is formed as an integral part of the flapper, on the side opposite its seat-engaging face 28. A restricted passage 34 extends into the flapper, and part way into the upper part of the auxiliary valve housing, in a direction perpendicular to the face 28, from a central location on the face. The restricted passage 34 communicates with another restricted passage 36 formed inside the auxiliary valve housing 32. The restricted passage 36 extends in a direction perpendicular to the passage 34, and terminates at a seat 38 at the top of a larger, cylindrical, passage 40. A ball 42 is located in passage 40, and is movable to and away from the seat 38 through a short distance, being prevented from escape from the passage 40 by a transverse pin 44. The seat 38 is preferably frusto-conical in shape so that the ball 42 is guided into a centered position against the end of restricted passage 36. The cylindrical passage 40 is preferably, but not necessarily, defined by a circular cylindrical wall. In any case, the cylindrical passage has an axis parallel to the generatrices, i.e., the parallel straight line elements, of the cylindrical wall. The cross-section of the cylindrical passage 40 should be only slightly larger than the size of the ball so that flow of liquid through the restricted passage, from the outlet port toward the inlet port, causes the ball to move axially toward seat 38.

FIG. 1 shows the ball 42 out of engagement with the seat 38, permitting slow reverse flow of liquid through the restricted passages 36 and 34 (from the outlet port 14 toward the inlet port 12) even when the flapper 20 is engaged with seat 24. FIG. 3, on the other hand, shows the ball 42 in engagement with the seat 38, thereby preventing reverse flow of liquid through the restricted passages 36 and 34 (from the outlet port 14 toward the inlet port 12).

Figure 4:
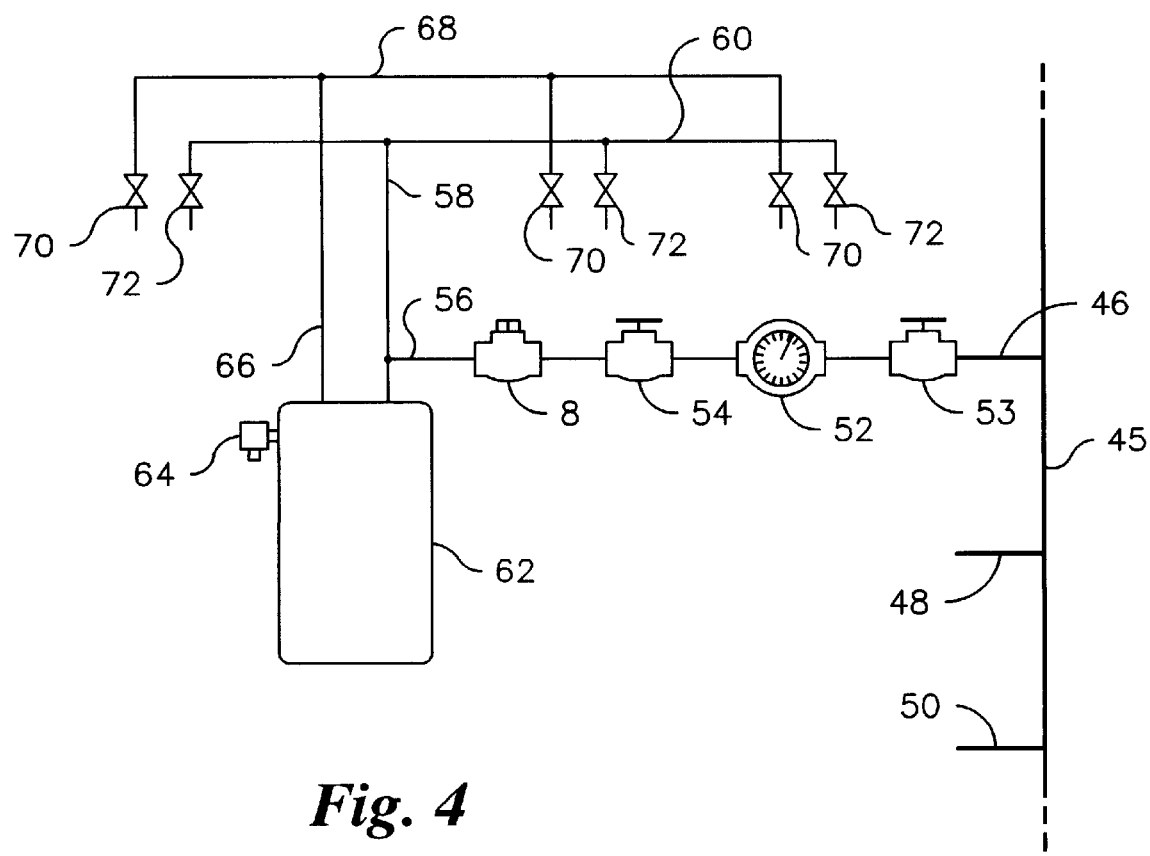
FIG. 4 is a schematic diagram of a water supply system incorporating a check valve in accordance with the invention.

The water supply system shown in FIG. 4 illustrates a typical application of the pressure equalizing check valve of the invention. A water main conduit 45 is tapped by lines 46, 48 and 50 to serve several residential users. The user served by line 46 receives water through a water meter 52 having shut-off valves 53 and 54 at its inlet and outlet, respectively. Another shut off valve (not shown) may be provided at the location at which line 46 is connected to the main conduit 45. The outlet shut-off valve 54 is connected to the user's cold water pipes 56, 58 and 60 through the pressure equalizing check valve 8. The cold water pipe 58 is connected to a water heater 62, which has a pressure relief valve 64. A hot water pipe 66 connects the outlet of the water heater to the user's hot water pipes 68. Valves 70 and 72 are representative of the user's hot and cold water faucets, shower valves, appliance shut-off valves, etc.

If all of valves 70 and 72 are closed, there being no demand for water by the user, the flapper in check valve 8 will also be closed, and consequently the user's water system will be essentially a closed system. If check valve 8 were a conventional check valve, operation of water heater 62 would cause pressure to build up in the closed system, and the pressure would be relieved only by the opening of one of the valves 70 or 72 or by the automatic operation of relief valve 64 on the water heater. The pressurization of the system would place a stress on the water heater, which, if repeated, would shorten its useful life. The pressure in the system could also cause hot water to flow into the user's cold water pipes, wasting energy.

The check valve in accordance with the invention prevents pressurization of the user's water system beyond the pressure level of the water supply. When used in the system of FIG. 4, the check valve will normally be in the condition illustrated in FIG. 1 when there is no demand for water. Gradual expansion of the water in the user's system due to heating by the water heater 62 causes water to flow slowly through passages 40, 36 and 34 in the auxiliary valve built into the flapper. Because the flow of water takes place slowly, ball 42 does not rise and does not engage the seat 38 to close off passage 36. Thus, pressure build-up in the user's water pipes is prevented by permitting a small amount of water to flow slowly through the auxiliary valve from the user's system in the reverse direction through the check valve 8, that is from outlet port 14 to inlet port 12.

If one of the valves 70 or 72 is opened, the flapper in the check valve opens automatically as shown in FIG. 2, to allow water to flow freely from the supply conduit 45 into the user's system.

In the event of a sudden drop in pressure in the main supply conduit 45, due for example to a break in conduit 45 or elsewhere in the system of the water utility, more rapid flow of water through the passage 44 causes the ball 42 to rise and engage seat 38, as shown in FIG. 3, thereby completely closing off the flow of water in the reverse direction through the check valve. The ball will remain in engagement with the seat while the pressure on the user's side of the check valve exceeds the pressure on the utility's side of the check valve by a significant predetermined amount. Therefore, no siphoning will take place while the pressure in the main conduit is below its normal level. In the case of a domestic water system, the predetermined pressure difference required to hold the ball in engagement with the seat is preferably less than approximately 0.2 atmospheres.

The movement of the ball into engagement with the seat is velocity-dependent. Thus, the conditions under which the ball will rise to engage the seat depend on the size of the restricted passages 34 and 36, the relationship between the size of the ball and the diameter of cylindrical passage 40, and the magnitude and rapidity of the decrease in pressure in the liquid on the upstream side of the pressure equalizing check valve.

The pressure difference required to hold the ball in engagement with its seat is dependent primarily on the area bounded by the circular line of contact between the ball and the seat and the mass of the ball. The ball will disengage the seat when the pressure difference falls below the required pressure difference. Preferably, to prevent leakage, the seat should be configured so that the ball engages the end of the restricted passage where the restricted passage meets the seat. In the case of a frusto-conical seat, the angle θ between the surface of the seat and an imaginary plane transverse to the axis of symmetry of the seat should be determined approximately by the following formula:

$$0 < \theta \leq \arcsin\frac{d_p}{d_b}$$

where $d_p$ is the diameter of the restricted passage 36 and $d_b$ is the diameter of the ball 42. Preferably, $$\theta \cong \arcsin\frac{d_p}{d_b}$$

The dimensions of the ball 42, of passage 40 and the restricted passages 34 and 36 in the flapper, and the configuration of the seat 38 can vary widely, but can be readily selected by those skilled in the art for any desired operating conditions. It has been determined experimentally that, in the case of a pressure equalizing check valve for a domestic water system, reliable performance can be realized using a rubber ball having a diameter of ³⁄₁₆ inch in a passage 40 having a diameter of ¼ inch and a length of ⅜ inch, and restricted passages 34 and 36 both having a diameter of ¹⁄₁₆ inch. In the case of a frusto-conical seat, the angle between the frusto-conical surface of the seat and an imaginary plane transverse to the axis of symmetry of the seat is preferably approximately 19.5 degrees. At this angle, the surface of the seat will be tangent to the ³⁄₁₆ inch ball 42 at the location of the ¹⁄₁₆ inch circle at the end of restricted passage 36.

The flapper, including the auxiliary valve, is preferably installed on a removable pivot pin so that it can be removed through access port 18 and replaced. Alternatively, it can be permanently installed in the valve body.

The pressure equalizing check valve can be made inexpensively and can be readily installed and used in domestic and industrial water systems to avoid the effects of pressure build-up in the systems while avoiding siphoning in the event of a sudden drop in supply pressure. Although the valve is believed to be primarily useful in domestic and industrial water systems, it can also be used as a pressure equalizing check valve with water and other liquids in various industrial processes.

Various modifications can be made to the valve described above. For example, although the flapper and its seat, as shown in FIGS. 1–3 are in metal-to-metal contact, it is possible to provide gaskets on the flapper, or on the seat, or both. The cylindrical ball passage 40 is preferably vertical when the flapper is closed, but can be oblique instead, and can even face upward if a ball having a density less than that of the liquid being handled is used.

The auxiliary valve housing can be located at a higher position on the flapper to allow the flapper a greater range of movement if necessary, as it is not necessary to locate passage 34 centrally on the flapper. The auxiliary valve housing 32, although preferably cast as a unit with the flapper, can be a separate element, threaded into, or otherwise connected to the flapper.

Some of the many advantages of the invention can be realized using various alternative valve configurations. For example, the flapper can be oblique, rather than vertical, when closed. The check valve shown is suitable for installation in a horizontal pipe, but a similar valve can be provided for installation in a vertical pipe. The pressure equalizing check valve can also be supplied as a built-in component of a water meter. Instead of a flapper, other check valve closure elements can be used, for example, spring-loaded valve closure elements that are axially movable rather than pivoted. Although the auxiliary valve is preferably built into and carried by the main check valve, as an alternative, the auxiliary valve can be provided in a by-pass channel connected in parallel with the main check valve.

Numerous other modifications can be made without departing from the invention as defined in the following claims.

I claim:

1. A pressure equalizing check valve comprising:
    a liquid conduit having an inlet port and an outlet port, the liquid conduit being closed except for the inlet and outlet ports;
    a main valve seat within said liquid conduit;
    a main valve closure element within said conduit, the main valve closure element being movable, in response to flow of liquid in a first direction through the conduit from the inlet port toward the outlet port, to an open position in which it is out of contact with the seat and permits free flow of liquid through the conduit, and in response to flow of liquid in a second direction opposite to the first direction through the conduit from the outlet port toward the inlet port, to a closed position in which it is in contact with the seat, and at least substantially retards flow through the conduit in the second direction;
    a restricted passage connecting the inlet port to the outlet port at least when the main valve closure element is in its closed position;
    an auxiliary valve controlling flow through the restricted passage when the main valve closure element is in its closed position, the auxiliary valve comprising an auxiliary valve closure element and an auxiliary seat, the auxiliary valve closure element being normally held away from the auxiliary seat and engageable with said auxiliary seat in response to flow of liquid through the restricted passage, from the outlet port toward the inlet port, at a rate in excess of a predetermined rate, to shut off flow of liquid through said auxiliary passage substantially completely;
    whereby, when the main valve closure element is in said closed position, the auxiliary valve permits slow flow of liquid through the restricted passage so that the liquid pressure at the outlet port is held at a level substantially equal to the liquid pressure at the inlet port, but when the liquid pressure at the inlet port drops substantially below the liquid pressure at the outlet port, the auxiliary valve closes, thereby substantially completely shutting off flow through the conduit in the second direction.

2. A pressure equalizing check valve according to claim 1, in which the restricted passage extends through said main valve closure element.

3. A pressure equalizing check valve according to claim 2, in which the auxiliary valve closure element is carried by the main valve closure element.

4. A pressure equalizing check valve according to claim 1, in which the main valve closure element is a pivoted flapper.

5. A pressure equalizing check valve according to claim 1, in which the auxiliary valve closure element is a ball movable into and out of engagement with the auxiliary seat.

6. A pressure equalizing check valve according to claim 5, in which the ball has a density greater than that of water, and in which the auxiliary seat faces downward at least when the main valve closure element is in engagement with said main valve seat.

7. A pressure equalizing check valve according to claim 6, in which the cross-section area of the restricted passage is sufficiently small that the ball is held against the auxiliary seat when the pressure difference between the inlet and outlet ports is greater than approximately 0.2 atm.

8. A pressure equalizing check valve according to claim 6, in which the auxiliary valve includes a cylindrical passage in which the ball is movable toward and away from the auxiliary seat, and in which the cross-section of the cylindrical passage is sufficiently small in relation to the size of the ball that flow of liquid through said cylindrical passage, occurring when the liquid pressure at the inlet port drops substantially below the liquid pressure at the outlet port, moves the ball into engagement with the auxiliary seat.

9. In a water supply system comprising a water supply main conduit serving a plurality of users, a water line connected to the main conduit for serving a water system of one of said plurality of users, the water system of said one user comprising a normally closed system of pipes, and a check valve in said water line for allowing free flow of water from the water supply main conduit into the one user's water system, the check valve comprising:
 a valve body having an upstream side and a downstream side, an internal valve seat, and a pivoted flapper cooperable with the internal valve seat for allowing flow through the conduit in a first direction from the upstream side to the downstream side for delivery of water from the water supply main to the one user's water system, and substantially restricting flow through the conduit in a second direction opposite to the first direction;
 a passage extending through the flapper;
 an auxiliary valve, carried by the flapper and permitting restricted flow, through the passage in the flapper, in said second direction when the flapper is in cooperation with the valve seat for restricting flow, the auxiliary valve being responsive to the flow of water through the passage, and closable in response to flow of water through the passage, in the second direction, at a rate in excess of a predetermined rate, to shut off flow of water through the passage substantially completely, and otherwise permitting restricted flow through the passage;
 whereby, when the flapper is in its flow-restricting position, the auxiliary valve permits slow flow of water through the restricted passage so that the water pressures on both sides of the flapper remain substantially equal, but when the water pressure on the upstream side of the valve drops substantially below the water pressure at downstream side of the valve port, the auxiliary valve closes, thereby substantially completely shutting off flow through the conduit in the second direction.

10. A water supply system according to claim 9, in which the water system of said one of said plurality of users includes a water heater, connected to said normally closed system of pipes, for heating water in at least a part of said normally closed system.

11. A water supply system according to claim 9, in which the passage extending through the flapper comprises a cylindrical passage, the cylindrical passage being defined by a cylindrical wall and having an axis parallel to the generatrices of the cylindrical wall, and in which the auxiliary valve comprises an auxiliary valve seat formed at one of said opposite ends of the cylindrical passage, and a ball within the cylindrical passage, the ball being movable axially within the cylindrical passage, through a limited range, into and out of engagement with the auxiliary valve seat.

12. A water supply system according to claim 11, in which the density of the ball is greater than the density of water, and in which the auxiliary valve seat faces downward when the flapper is in cooperation with internal valve seat for substantially restricting flow through the conduit in said second direction.

13. A water supply system according to claim 11, in which the auxiliary valve comprises an auxiliary valve housing formed as an integral part of the flapper.

14. A water supply system according to claim 13, in which the passage extending through the flapper comprises a cylindrical passage formed in said auxiliary valve housing, the cylindrical passage being defined by a cylindrical wall and having an axis parallel to the generatrices of the cylindrical wall, and having opposite ends, and in which the auxiliary valve comprises an auxiliary valve seat formed at one of said opposite ends of the cylindrical passage, and a ball within the cylindrical passage, the ball being movable axially within the cylindrical passage, through a limited range, into and out of engagement with the auxiliary valve seat.

15. A water supply system according to claim 14, in which the density of the ball is greater than the density of water, and in which the auxiliary valve seat faces downward when the flapper is in cooperation with internal valve seat for substantially restricting flow through the conduit in said second direction.

16. A valve closure element for use in a check valve for allowing free flow of water from a water supply main conduit into a user's water system, the valve closure element comprising:
 a pivotable flapper cooperable with a valve seat in a valve body for allowing flow through the valve body in a first direction and substantially restricting flow through the valve body in a second direction opposite to the first direction;
 a passage extending through the flapper;
 an auxiliary valve, carried by the flapper and permitting restricted flow, through the passage in the flapper, in said second direction when the flapper is in cooperation with a valve seat for restricting flow, the auxiliary valve being responsive to the flow of water through the passage, and closable in response to flow of water through the passage, in the second direction, at a rate in excess of a predetermined rate, to shut off flow of water through the passage substantially completely, and otherwise permitting restricted flow through the passage;
 whereby, when the flapper is in its flow-restricting position, the auxiliary valve permits slow flow of water through the restricted passage so that the water pressures on both sides of the flapper remain substantially equal, but when the water pressure in the water supply main conduit drops substantially below the water pressure in the user's water system, the auxiliary valve closes, thereby substantially completely shutting off flow through the valve body in the second direction.

17. A valve closure element according to claim 16, in which the passage extending through the flapper comprises a cylindrical passage, the cylindrical passage being defined by a cylindrical wall and having an axis parallel to the generatrices of the cylindrical wall, and in which the auxiliary valve comprises an auxiliary valve seat formed at one of said opposite ends of the cylindrical passage, and a ball within the cylindrical passage, the ball being movable axially within the cylindrical passage, through a limited range, into and out of engagement with the auxiliary valve seat.

18. A valve closure element according to claim 16, in which the auxiliary valve comprises an auxiliary valve housing formed as an integral part of the flapper.

19. A valve closure element according to claim 18, in which the passage extending through the flapper comprises a cylindrical passage formed within the auxiliary valve housing, the cylindrical passage being defined by a cylindrical wall and having an axis parallel to the generatrices of the cylindrical wall, and in which the auxiliary valve comprises an auxiliary valve seat formed at one of said opposite ends of the cylindrical passage, and a ball within the cylindrical passage, the ball being movable axially within the cylindrical passage, through a limited range into and out of engagement with the auxiliary valve seat.

20. A pressure equalizing check valve comprising:
   liquid conduit means comprising a conduit having an inlet and an outlet, the liquid conduit means being closed except for the inlet and outlet;
   first valve means within said conduit, operable, in response to flow of liquid in a first direction through the conduit from the inlet toward the outlet to permit free flow of liquid through the conduit, and in response to flow of liquid in a second direction opposite to the first direction through the conduit from the outlet toward the inlet, at least substantially to retard flow through the conduit in the second direction;
   means providing a restricted passage connecting said inlet and outlet; and
   second valve means for permitting slow flow of liquid through the conduit in the second direction, but responsive to flow of liquid through the restricted passage, from the outlet toward the inlet, at a rate in excess of a predetermined rate, to shut off flow of liquid through the conduit in the second direction substantially completely.

21. A pressure equalizing check valve according to claim 20, in which the second valve means continues to shut off flow of liquid through the conduit in the second direction so long as the pressure of liquid at the outlet exceeds the pressure of liquid at the inlet by a predetermined amount.

22. A pressure equalizing check valve comprising:
   liquid conduit means comprising a conduit having an inlet and an outlet, the liquid conduit means being closed except for the inlet and outlet;
   first valve means within said conduit, operable, in response to flow of liquid in a first direction through the conduit from the inlet toward the outlet to permit free flow of liquid through the conduit, and in response to flow of liquid in a second direction opposite to the first direction through the conduit from the outlet toward the inlet, at least substantially to retard flow through the conduit in the second direction; and
   second valve means for permitting slow flow of liquid through the conduit in the second direction, but responsive to a substantial drop in pressure at said inlet, to shut off flow of liquid through the conduit in the second direction substantially completely.

* * * * *